(12) United States Patent
Faubert et al.

(10) Patent No.: US 6,206,455 B1
(45) Date of Patent: Mar. 27, 2001

(54) SLIDING DOOR STABILIZER

(75) Inventors: Robert J. Faubert, Rochester Hills; Robert M. McIntyne, Troy, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/302,724

(22) Filed: Apr. 30, 1999

(51) Int. Cl.[7] .................. E06B 7/00; E05F 5/06; B60J 5/06
(52) U.S. Cl. ............ 296/155; 296/207; 16/86 B
(58) Field of Search .............. 296/155, 146.1, 296/207; 49/483.1; 16/82, 85, 86 R, 86 A, 86 B

(56) References Cited

U.S. PATENT DOCUMENTS

| | | | |
|---|---|---|---|
| Re. 36,825 | * 8/2000 | Dailey ................... | 49/483.1 |
| 3,312,015 | * 4/1967 | Plegat .................... | 296/155 |
| 4,192,039 | * 3/1980 | Haberle et al. ......... | 16/86 R |
| 4,580,823 | * 4/1986 | Yamada et al. ......... | 296/155 |
| 4,869,544 | * 9/1989 | Anwyll et al. .......... | 296/155 |
| 4,936,621 | * 6/1990 | Shimoda et al. ........ | 296/207 |
| 4,991,905 | * 2/1991 | Watanabe et al. ....... | 296/155 |
| 5,358,301 | * 10/1994 | Konchan et al. ........ | 296/146.1 |
| 5,433,031 | * 7/1995 | Dailey .................... | 49/483.1 |
| 5,536,061 | 7/1996 | Moore et al. ........... | 296/155 |
| 5,544,930 | 8/1996 | Stedman ................ | 296/146.6 |
| 5,549,351 | * 8/1996 | Park ....................... | 296/207 |
| 5,577,795 | * 11/1996 | Shinsen ................. | 296/155 |
| 5,626,384 | * 5/1997 | Walther ................. | 296/155 |
| 5,791,723 | * 8/1998 | Bell et al. .............. | 296/155 |
| 5,799,449 | * 9/1998 | Lyons et al. ........... | 296/146.1 |
| 5,832,668 | 11/1998 | Faubert et al. ......... | 49/215 |
| 5,927,018 | * 7/1999 | Thain ..................... | 16/86 R |

FOREIGN PATENT DOCUMENTS

| | | | |
|---|---|---|---|
| 3103881 | * 8/1982 | (DK) ..................... | 296/155 |
| 2478718 | * 9/1981 | (FR) ...................... | 296/155 |
| 002261011 | * 5/1993 | (GB) ..................... | 296/146.1 |
| 0039520 | * 3/1983 | (JP) ....................... | 296/155 |

\* cited by examiner

*Primary Examiner*—D. Glenn Dayoan
*Assistant Examiner*—Hilary Gutman
(74) *Attorney, Agent, or Firm*—Mark P. Calcaterra

(57) ABSTRACT

A stabilizer for firmly holding a sliding door of an automotive vehicle in a closed position. The stabilizer has a female part adapted to be secured to the "B" pillar of the vehicle and a male part adapted to be secured to the door. The female part has a socket portion to receive a projection on the male part. The socket portion is in the form of a pocket having spaced confronting side walls and a bottom wall. Each side wall has spaced slots extending from the opening of the pocket toward the bottom wall. Ribs of an elastomeric material are bonded in the slots and press against the projection on the male part when the door is closed and the projection enters the pocket.

13 Claims, 5 Drawing Sheets

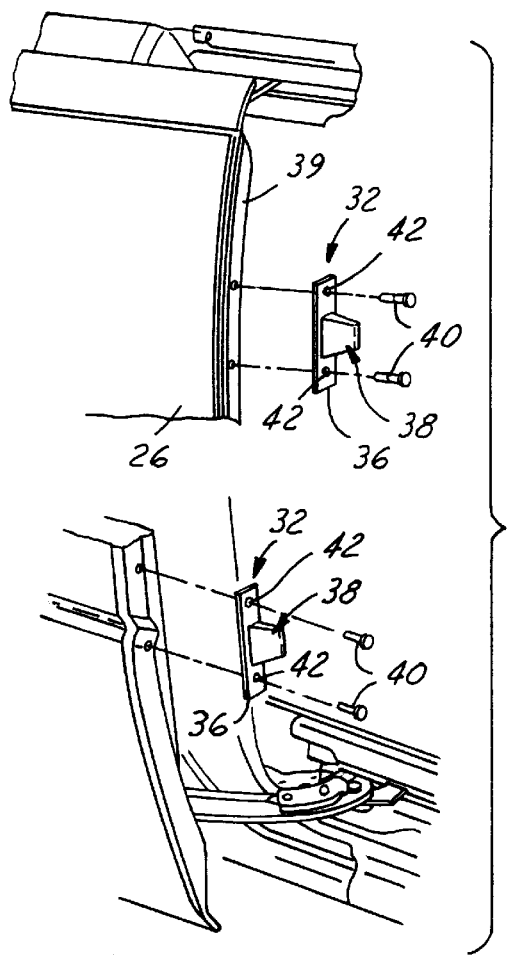
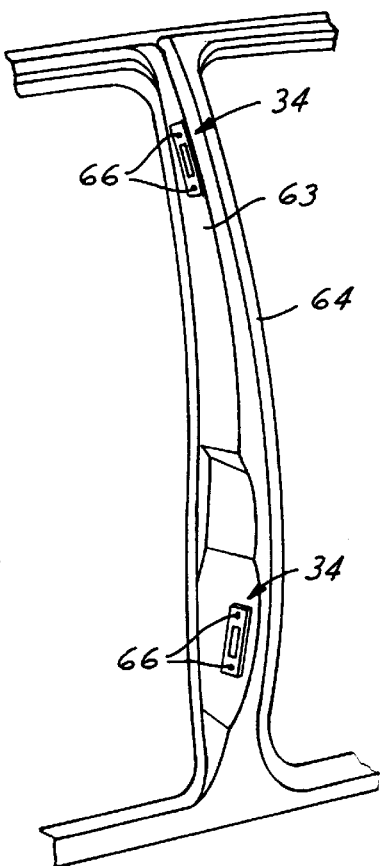
FIG. 3
FIG. 4
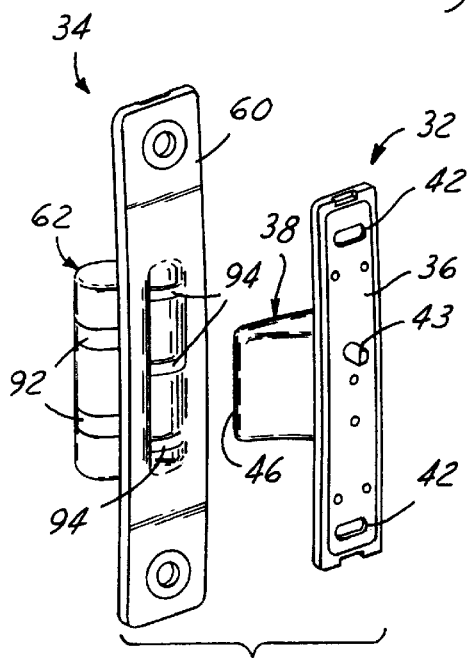
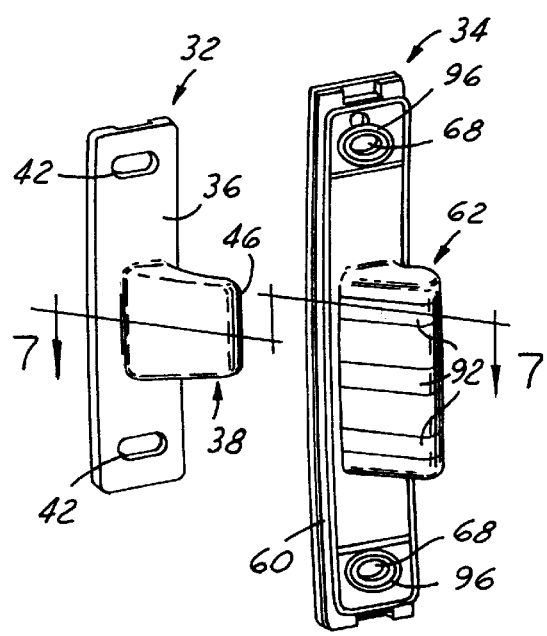
FIG. 5
FIG. 6

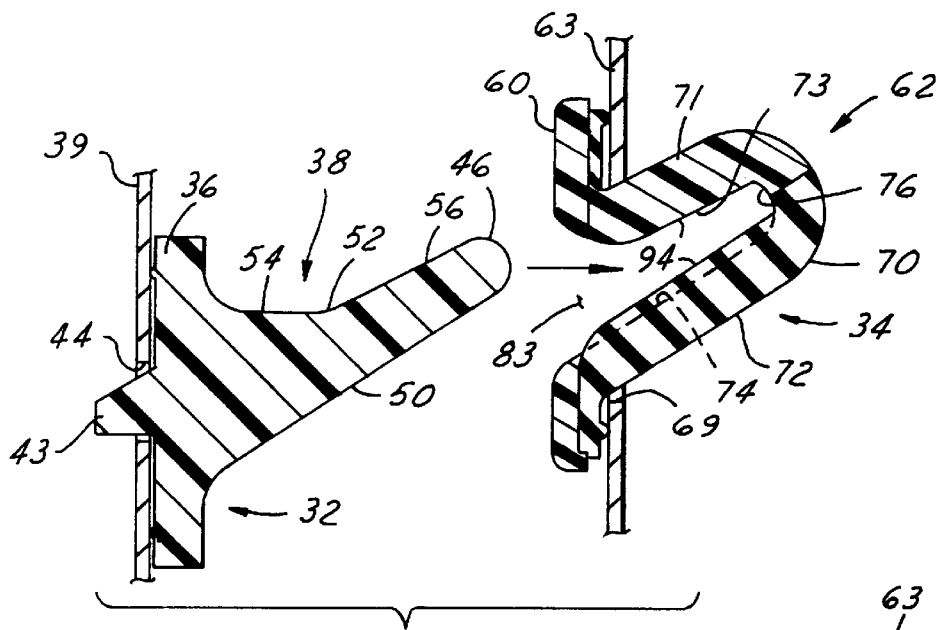
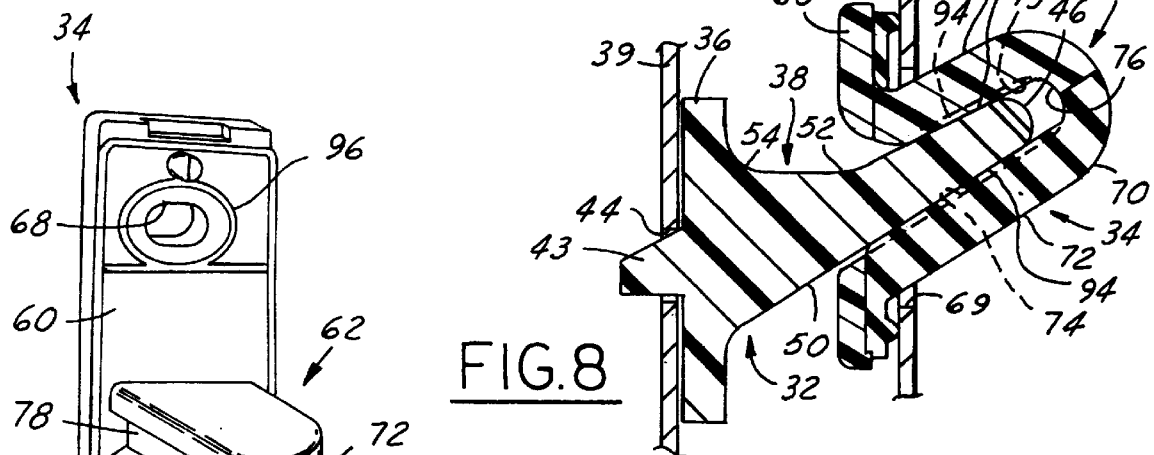
FIG. 7
FIG. 8
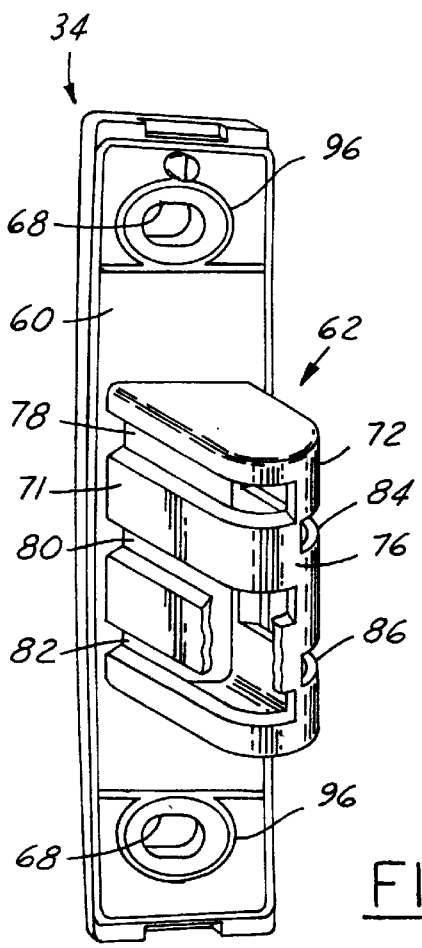
FIG. 20
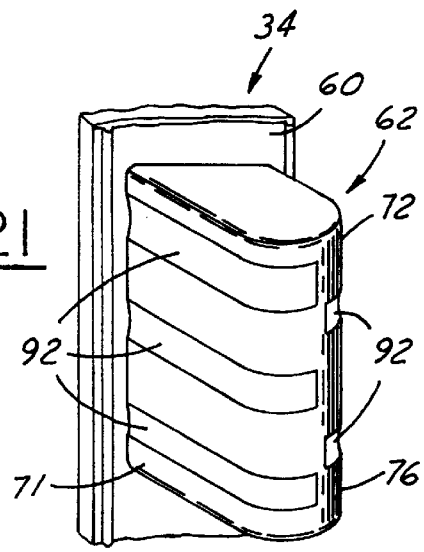
FIG. 21

SLIDING DOOR STABILIZER

This invention relates generally to stabilizers and more particularly to a stabilizer for holding a sliding door of an automotive vehicle firmly closed against a pillar of the vehicle.

BACKGROUND AND SUMMARY OF THE INVENTION

Automotive vehicles such as so-called mini-vans have one and sometimes two sliding doors. These sliding doors often do not close tightly, and thus become the source of rattles and squeaks. What is needed is something to hold a sliding door firmly closed without any cross-car or inboard and outboard movement.

In accordance with the present invention, a stabilizer is provided having a female part secured to a pillar, sometimes referred to as the "B" pillar, of the vehicle and a male part secured to the door. The female part has a socket portion adapted to receive a projecting portion of the male part. One of the portions, preferably the socket portion, has a plurality of ribs to contact the other portion, in this case the projecting portion, when the projecting portion is engaged therein.

Preferably the socket portion is in the form of a pocket having spaced confronting side walls. Each side wall has spaced apart slots, and ribs of a compressible material fill the slots. Preferably the ribs in the slots of one side wall are staggered with respect to the ribs in the slots of the other side wall.

In the preferred construction about to be described, the ribs are parallel and extend from the pocket opening toward the bottom of the pocket. The ribs are thus generally aligned with the direction of movement of the projecting portion of the male part into the pocket when the door is closed.

One object of this invention is to provide a stabilizer for a sliding door having the foregoing features and capabilities.

Another object is to provide a stabilizer which is composed of a relatively few simple parts, is rugged and durable in use, and is capable of being easily and inexpensively manufactured and installed.

These and other objects, features and advantages of the invention will become more apparent as the following description proceeds, especially when considered with the accompanying drawings.

BRIEF DESCRIPTION OF THE DRAWINGS

FIG. 3 is an exploded fragmentary perspective view with parts broken away of an edge of the sliding door equipped with the male parts of an upper stabilizer and a lower stabilizer.

FIG. 4 is a fragmentary perspective view showing the female parts of the upper and lower stabilizers mounted on a door pillar.

FIG. 5 is a perspective view showing the two parts of a stabilizer prior to engagement.

FIG. 6 is a view similar to FIG. 5 but showing the stabilizer parts as seen from the opposite side.

FIG. 7 is a sectional view taken on the line 7—7 in FIG. 6, showing the two parts of the stabilizer prior to engagement.

FIG. 8 is a view similar to FIG. 7 but showing the two parts of the stabilizer in engagement with one another.

FIG. 20 is a perspective view of the female part of the stabilizer with the ribs removed.

FIG. 21 is a fragmentary perspective view showing a portion of FIG. 20, with the slots filled with an elastomeric material to form the ribs.

DETAILED DESCRIPTION OF THE PREFERRED EMBODIMENT

Figure 1:
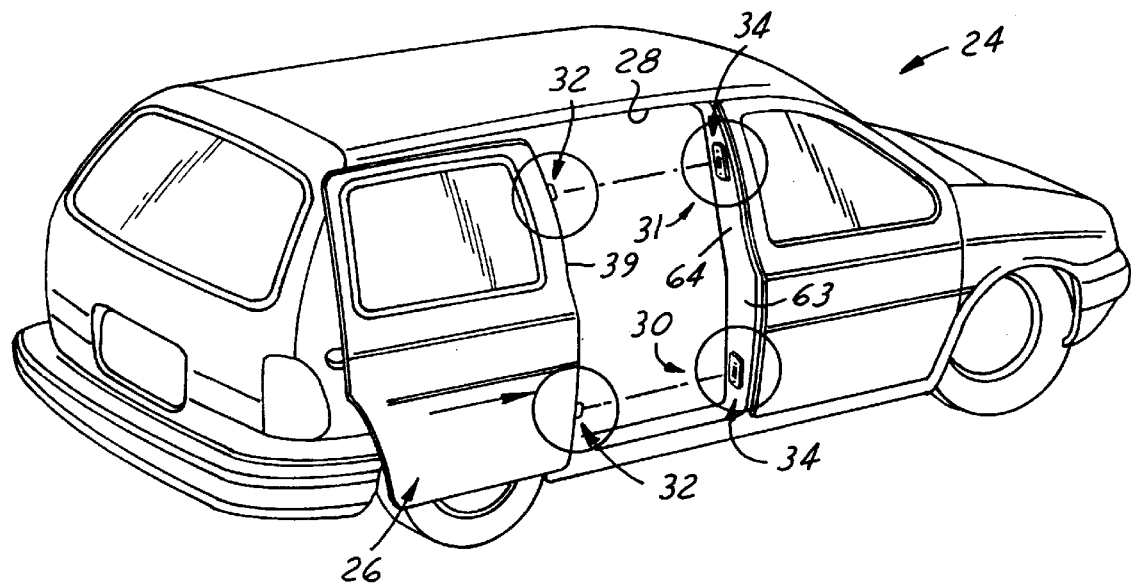
FIG. 1 is a perspective view of an automobile having a sliding door in the open position, and equipped with stabilizers constructed in accordance with the invention.
Figure 2:
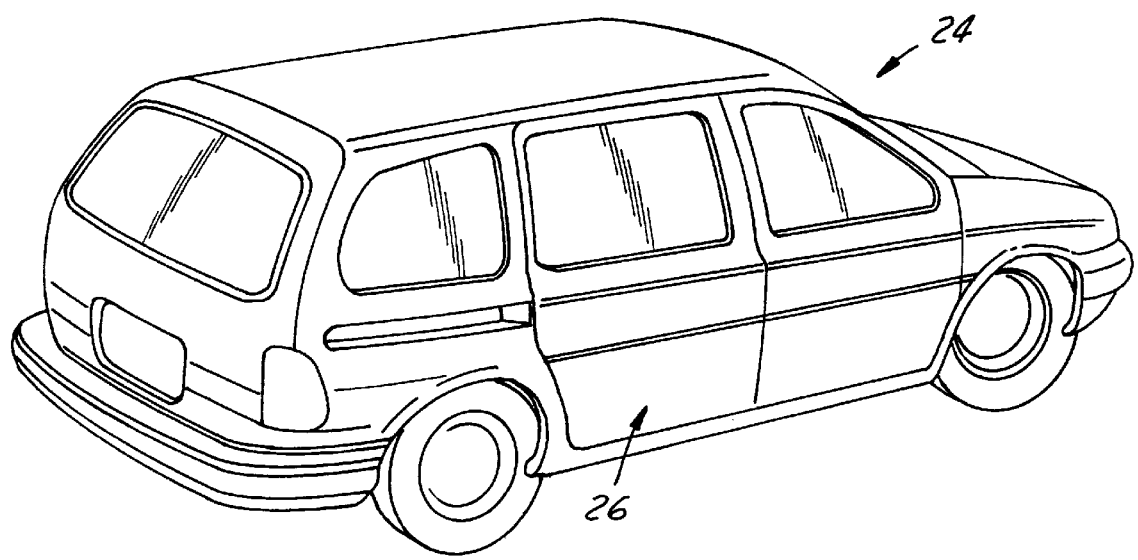
FIG. 2 is a perspective view similar to FIG. 1 but with the sliding door closed.
Figure 9:
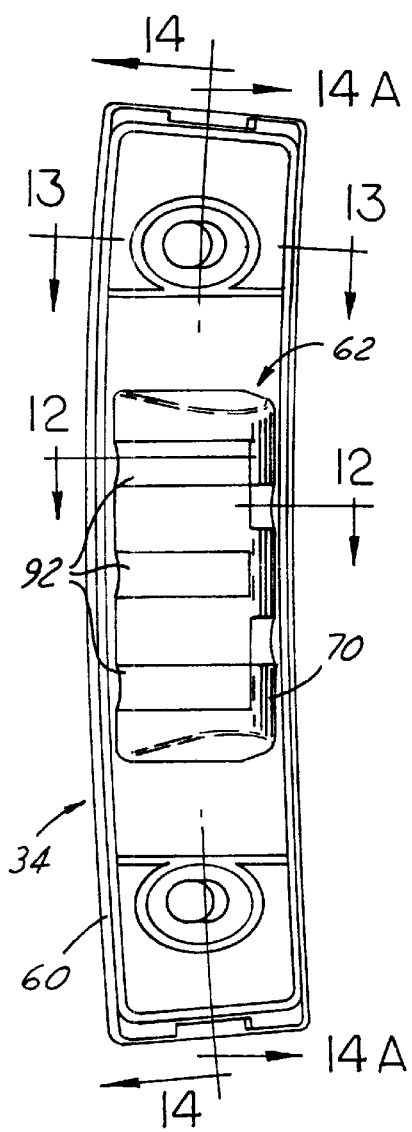
FIG. 9 is an elevational view of the female part of the stabilizer.
Figure 10:
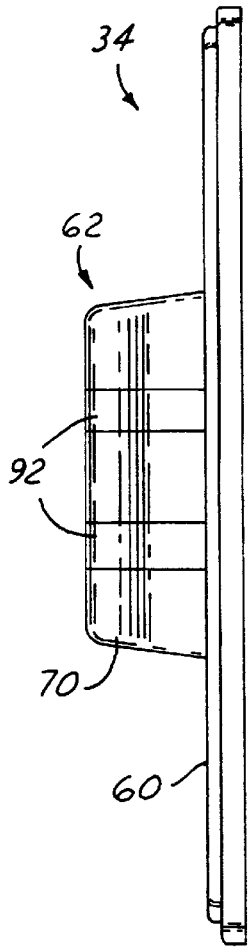
FIG. 10 is an edge view of the stabilizer part shown in FIG. 9.
Figure 11:
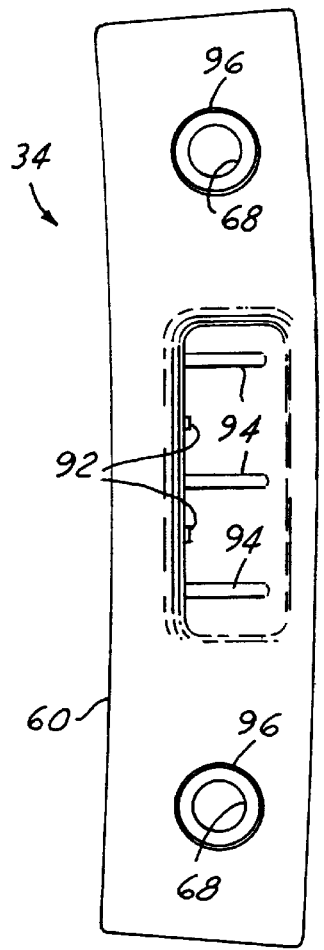
FIG. 11 is an elevational view of the stabilizer part shown in FIG. 9, as seen from the opposite side.
Figure 12:
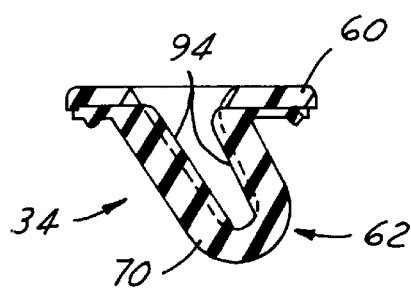
FIG. 12 is a sectional view taken on the line 12—12 in FIG. 9.
Figure 13:
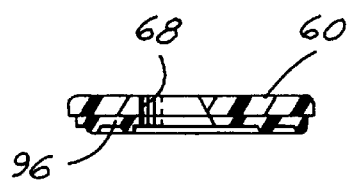
FIG. 13 is a sectional view taken on the line 13—13 in FIG. 9.

Referring now more particularly to the drawings, there is shown in FIGS. 1 and 2 an automotive vehicle 24 having a horizontal sliding door 26 that spins and closes in an opening 28 in the vehicle body, and at least one and preferably, as in this case, two stabilizers 30 and 31. Each stabilizer includes a male part 32 and a female part 34 for ensuring that when closed the door is held firmly without any cross-car or inboard or outboard movement. The two stabilizers 30 and 31 are identical and therefore a description of one will be sufficient for both.

The male part 32 (FIGS. 5–8 and 15–19) of each stabilizer has a mounting portion in the form of an elongated, generally rectangular flat plate 36, and a projecting portion or projection 38 integral and of one piece with the plate 36. The male part is secured to a generally vertical side edge portion 39 of the door by fasteners 40 extending through holes 42 in the upper and lower end portions of the plate 36 to secure the plate in a generally vertical or upright position. A locator 43 on the plate 36 extends through a hole 44 in the edge portion 39.

The projection 38 is vertically elongated and extends laterally outwardly from a mid-point of the plate 36 to its outer free edge or tip 46, which tip is vertical and generally parallel to the plane of the plate. A vertical side wall 50 of the projection 38 is flat. The opposite vertical side wall 52 has the angled configuration shown in FIG. 7, with an inner portion 54 tapering in an outward direction toward the tip 46 at a relatively large angle and an outer portion 56 tapering in an outward direction toward the tip 46 at a smaller angle.

The female part 34 (FIGS. 5–14, 14A, 20 and 21) of each stabilizer has a mounting portion in the form of an elongated generally rectangular flat plate 60 and a socket portion 62 integral and of one piece with the plate 60. The female part is secured to a wall 63 of a generally vertical pillar 64 of the vehicle body, in this case the "B" pillar, by fasteners 66 extending through holes 68 in the upper and lower end portions of the plate 60 to secure the plate in a generally upright position, with the socket portion 62 extending into the pillar through an opening 69.

The socket portion 62 is in the form of a pocket 70 which extends into the hollow interior of the pillar 64. Referring to FIGS. 7 and 8, the pocket has laterally spaced, vertical substantially flat side walls 71 and 72, the inner surfaces 73 and 74 of which taper toward one another in a direction toward the arcuate inner surface 75 of the bottom wall 76. The taper of the inner surfaces 73 and 74 of the side walls 71 and 72 of the pocket of the female part is the same as the taper of the side wall 50 and the outer portion 56 of the side wall 52 of the projection 38 of the male part. The male and female parts 32 and 34 are inclined at the same angle as shown in FIG. 7 so as to be aligned with the path of the door in the final stage of its movement to closed position.

Figure 14:
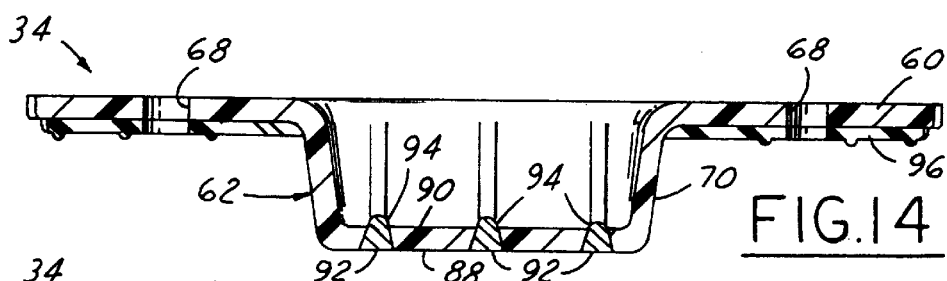
FIG. 14 is a sectional view taken on the line 14—14 in FIG. 9.
Figure 14A:
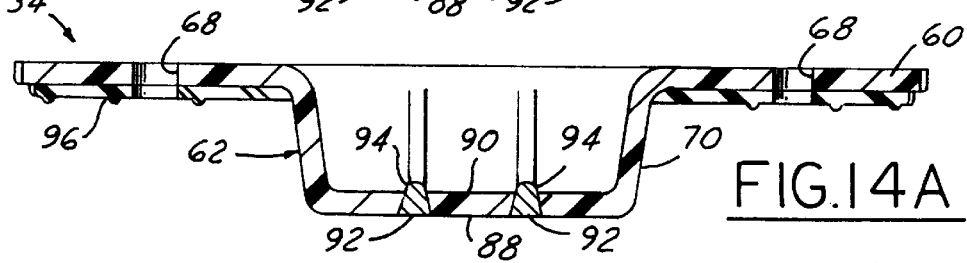
FIG. 14A is a sectional view taken on the line 14A—14A in FIG. 9.
Figures 15, 16, 17:
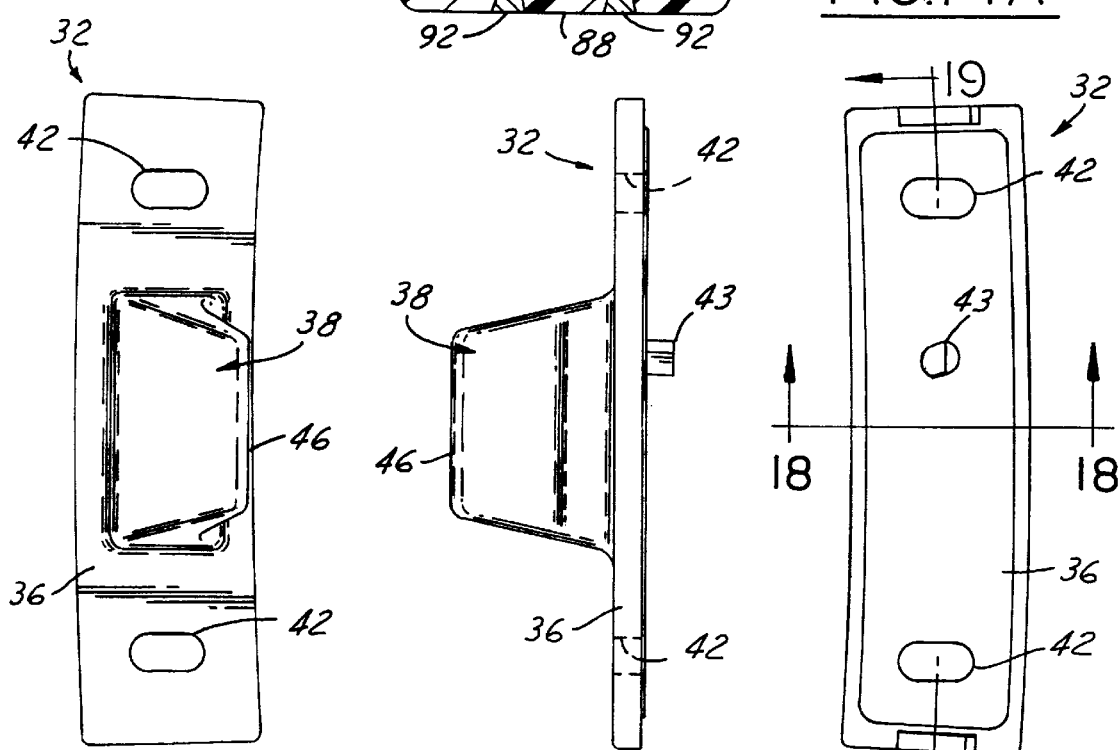
FIG. 15 is an elevational view of the male part of the stabilizer.
FIG. 16 is an edge view of the stabilizer part shown in FIG. 15.
FIG. 17 is an elevational view of the stabilizer part shown in FIG. 15 as seen from the opposite side.
Figure 18:
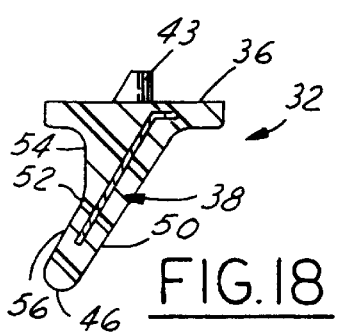
FIG. 18 is a sectional view taken on the line 18—18 in FIG. 17.
Figure 19:
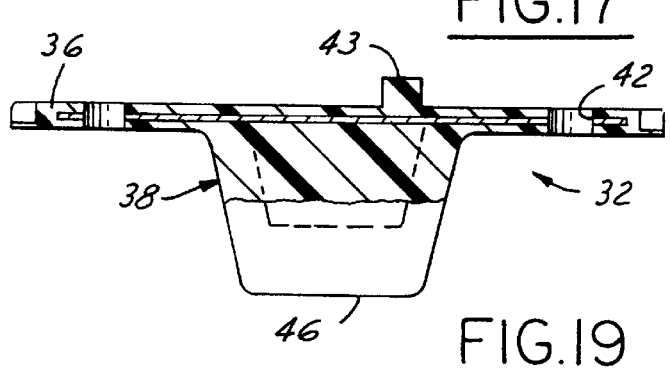
FIG. 19 is a sectional view taken on the line 19—19 in FIG. 17.

The side wall 71 has three equally spaced apart elongated slots 78, 80 and 82 (FIG. 20) which extend from the pocket opening 83 to and including about one-half of the bottom wall 76. The side wall 72 has two spaced apart elongated slots 84 and 86 which extend from the pocket opening 83 to and including about one-half of the bottom wall 76. The slot 84 terminates in the bottom wall 76 between the slots 78 and 80, and the slot 86 terminates in the bottom wall 76 between the slots 80 and 82. The slots 78–86 are parallel to one another and substantially horizontal when the male and female parts are mounted on the door and pillar as shown. In cross section, the slots 78–86 are slanted as shown in FIGS. 14 and 14A, being wider where they open through the outer surface 88 of the pocket and narrower where they open through the inner surface 90 of the pocket.

Each of the slots 78–86 is filled with a compressible material which is bonded to the side walls of the slots. The compressible material is preferably elastomeric such as synthetic rubber. The material filling the slots provide elongated ribs 92. The ribs 92 in the slots on each side wall of the pocket taper toward the opposite side wall at the same angle as the inner surfaces 73 and 74 of the side walls. The outer surfaces of the ribs are substantially flush with the outer surface 88 of the pocket and the inner surfaces of the ribs extend into the pocket beyond the inner surface 90 thereof to provide contact beads 94.

The flat plate 60 of each female member 34 has a layer 96 of sealing material, which may be the same material as the ribs 92, around each hole 68 to seal against the entrance of moisture into the pillar 64.

In use, and with the stabilizers mounted on the edge of the door and the "B" pillar as shown and described, the projection 38 of the male part will enter the pocket 70 of the female part and assume the position shown in FIG. 8 when the door is fully closed. The projection 38 will be firmly held by the contact beads 94 of the ribs 92. The contact beads may compress slightly to yieldably yet firmly hold the projection 38. The outer surfaces of the ribs, that is those surfaces on the outside of the pocket, are free to expand slightly to enable the projection to easily enter the pocket and further enhance the yielding grip of the ribs on the projection. The projection and the pocket are inclined as shown in FIG. 8 in a direction which more or less conforms with the direction of door movement in the final stage of closing. Thus the projection enters and leaves the pocket when the door is open and closed, but when the door is closed the door is held by the stabilizers against inboard and/or outboard movement. While the male part 32 of each stabilizer is shown and described as being mounted on the door and the female part is shown and described as being mounted on the pillar, it will be understood that the parts may be reversed with the male part mounted on the pillar and the female part mounted on the door.

What is claimed is:

1. A stabilizer for holding a sliding door of an automotive vehicle firmly closed against a vehicle pillar, comprising, a female part having a socket portion, and a male part having an outwardly projecting portion, said socket portion being adapted to closely receive said projecting portion, one of said parts being adapted to be secured to the door and the other of said parts being adapted to be secured to the pillar in positions such that the projecting portion of said male part enters the socket portion of the female part when the door is closed, said socket portion having a plurality of ribs adapted to contact said projecting portion when said projecting portion enters the socket portion, wherein the socket portion is in the form of a pocket defined by a wall having spaced apart slots, and said ribs fill said respective slots.

2. A stabilizer as defined in claim 1, wherein said ribs have beads projecting into said pocket to contact said projecting portion.

3. A stabilizer as defined in claim 2, wherein said ribs are made of an elastomeric material.

4. A stabilizer as defined in claim 2, wherein said ribs are made of a compressible material bonded to side walls of the slots.

5. A stabilizer as defined in claim 2, wherein said ribs are made of a compressible synthetic rubber bonded to side walls of the slots.

6. A stabilizer for holding a sliding door of an automotive vehicle firmly closed against a vehicle pillar, comprising, a female part having a socket portion, and a male part having an outwardly projecting portion, said socket portion being adapted to closely receive said projecting portion, one of said parts being adapted to be secured to the door and the other of said parts being adapted to be secured to the pillar in positions such that the projecting portion of said male part enters the socket portion of the female part when the door is closed, said socket portion having a plurality of ribs adapted to contact said projecting portion when said projecting portion enters the socket portion, wherein the socket portion is in the form a pocket having spaced confronting side walls, each of said side walls having spaced apart slots, and said ribs fill said respective slots, said ribs having beads projecting into said pocket to contact said projecting portion.

7. A stabilizer as defined in claim 6, wherein the ribs in the slots of one of said side walls are staggered with respect to the ribs in the slots of the other of said side walls.

8. A stabilizer as defined in claim 7, wherein said ribs are made of a compressible synthetic rubber bonded to side walls of the slots.

9. A stabilizer for holding a sliding door of an automotive vehicle firmly closed against a vehicle pillar, comprising, a female part having a socket portion, and a male part having an outwardly projecting portion, said socket portion being adapted to closely receive said projecting portion, one of said parts being adapted to be secured to the door and the other of said parts being adapted to be secured to the pillar in positions such that the projecting portion of said male part enters the socket portion of the female part when the door is closed, said socket portion having a plurality of ribs adapted to contact said projecting portion when said projecting portion enters the socket portion, wherein said female part has a mounting portion, said socket portion is in the form of a pocket having an opening through the mounting portion, said pocket having spaced confronting side walls and a bottom wall, each of said side walls having spaced apart elongated parallel slots extending from the pocket opening toward the bottom wall, said ribs filling said slots, said ribs having elongated beads extending lengthwise of said slots and projecting into said pocket to contact said projecting portion.

10. A stabilizer as defined in claim 9, wherein the ribs in the slots of one of said side walls are staggered with respect to the ribs in the slots of the other of said side walls.

11. A stabilizer as defined in claim 10, wherein said slots extend entirely through said side walls so that said ribs are free to yield when contacted by the projecting portion of the male part.

12. A stabilizer as defined in claim 11, wherein said ribs are made of a compressible synthetic rubber bonded to side walls of the slots.

13. A stabilizer as defined in claim 12, wherein the mounting portion comprises a plate having spaced holes to receive mounting fasteners, a sealing layer covering a side of said plate and encircling said holes to seal against the fasteners, said sealing layer comprising a compressible elastomeric material.

* * * * *

UNITED STATES PATENT AND TRADEMARK OFFICE
CERTIFICATE OF CORRECTION

PATENT NO. : 6,206,455 B1
DATED : March 27, 2001
INVENTOR(S) : Robert J. Faubert et al.

It is certified that error appears in the above-identified patent and that said Letters Patent is hereby corrected as shown below:

<u>Title page,</u>
Item [75], line 2, the second inventor's name, please delete "McIntyne" and insert -- McIntyre --

Signed and Sealed this

Twenty-second Day of January, 2002

Attest:

*Attesting Officer*

JAMES E. ROGAN
*Director of the United States Patent and Trademark Office*